Figure 1:
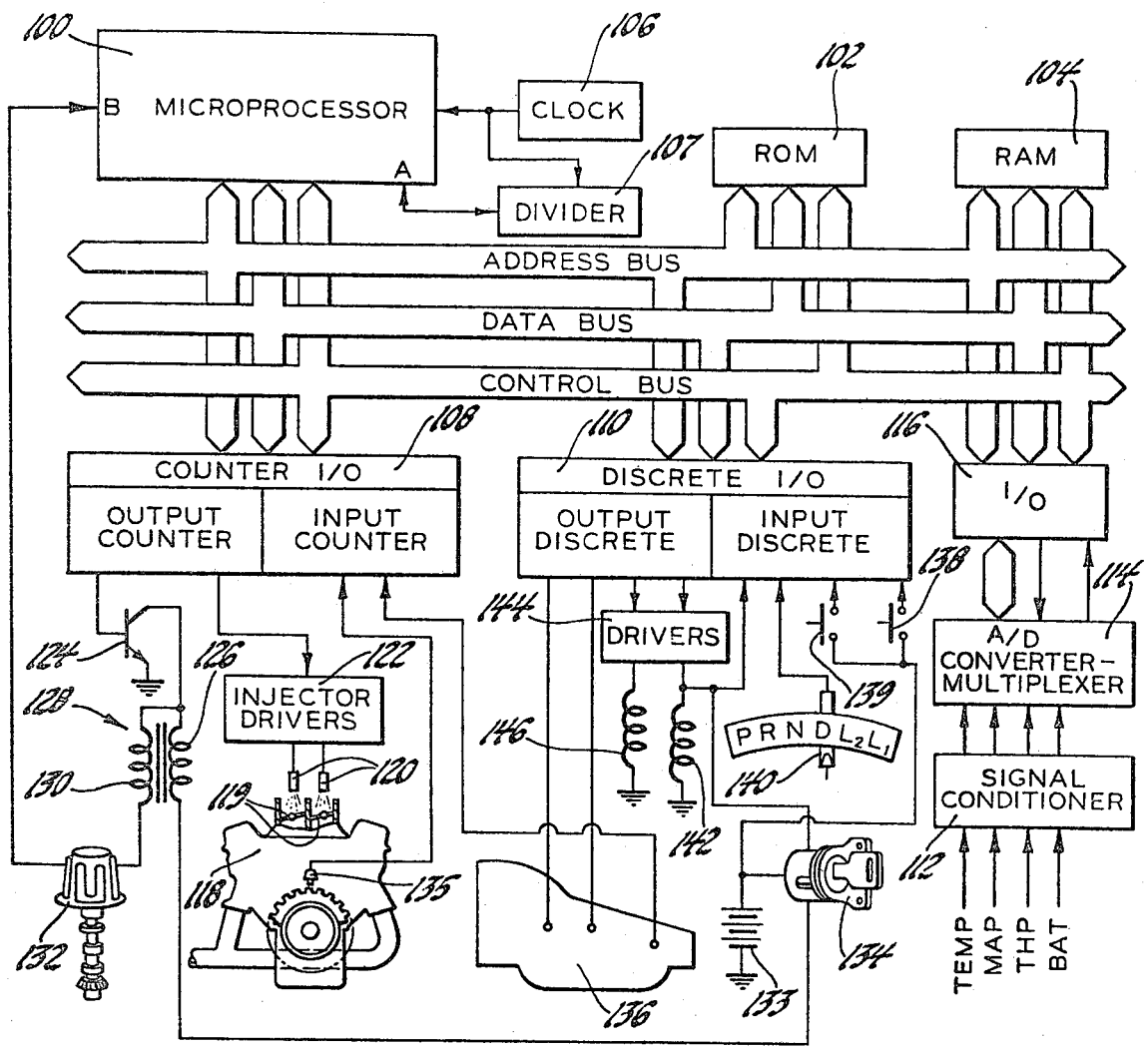

United States Patent [19]

Malik

[11] 4,364,343
[45] Dec. 21, 1982

[54] AUTOMATIC ENGINE SHUTDOWN AND RESTART SYSTEM

[75] Inventor: Marvin J. Malik, Bloomfield Hills, Mich.

[73] Assignee: General Motors Corporation, Detroit, Mich.

[21] Appl. No.: 261,704

[22] Filed: May 8, 1981

[51] Int. Cl.³ .................................. F02N 17/00
[52] U.S. Cl. ...................... 123/179 B; 123/179 G; 123/179 BG; 123/198 DB; 123/198 DC
[58] Field of Search ........ 123/179 B, 179 BG, 179 A, 123/179 G, 198 DB, 198 F, 198 DC; 180/54 R

[56] References Cited
U.S. PATENT DOCUMENTS

| | | | |
|---|---|---|---|
| 4,136,329 | 1/1979 | Trobert | 180/54 R |
| 4,186,697 | 2/1980 | Yasuda et al. | 123/179 BG |
| 4,192,279 | 3/1980 | Maisch et al. | 123/198 F |
| 4,194,483 | 3/1980 | McChesney et al. | 123/179 G |
| 4,198,945 | 4/1980 | Eyermann et al. | 123/179 B |
| 4,224,913 | 9/1980 | Barnard | 123/179 G |
| 4,286,683 | 9/1981 | Zeigner et al. | 123/179 B |

Primary Examiner—P. S. Lall
Attorney, Agent, or Firm—Howard N. Conkey

[57] ABSTRACT

An automatic vehicle engine stop-restart system responsive to throttle position is disclosed in which the engine is shut down by disabling the fuel supply in response to a closed throttle and restarted in response to an open throttle. During shutdown, the intake manifold is primed with an air and fuel mixture just prior to the stopping of the engine to provide an immediate restart capability.

3 Claims, 12 Drawing Figures

AUTOMATIC ENGINE SHUTDOWN AND RESTART SYSTEM

This invention relates to a method and apparatus for automatically shutting down and restarting a vehicle internal combustion engine.

In order to reduce the consumption of fuel and to reduce the amount of emissions from a vehicle internal combustion engine, it has been suggested to shut down the engine when the vehicle is brought to a stop and to automatically restart the engine in response to an operator command to initiate vehicle movement. For example, in prior shutdown-restart systems, the engine may be shut down in response to a closed throttle and thereafter restarted in response to the opening of the throttle. Typically, the shutdown is effected by disabling the engine fuel supply. However, this results in the intake manifold of the engine being filled with unfueled air when the engine is stopped. Thereafter when an automatic restart is initiated, the engine must be cranked for an undesirable certain amount of time before the intake manifold is again filled with an air-fuel mixture that will support combustion so that the engine can be started.

It is the general object of this invention to provide an automatic shutdown and restart system for a vehicle engine having improved restart capability.

It is another object of this invention to provide an automatic vehicle engine stop and restart system establishing an air-fuel mixture in the engine intake manifold during engine shutdown to provide immediate restart capability.

It is another object of this invention to provide an automatic shutdown and restart system for an internal combustion engine of a vehicle in which the engine is shut down by disabling the fuel flow to the engine and in which the intake manifold is primed with an air-fuel mixture prior to the stopping of engine rotation to provide immediate restart capability.

Figure 11:
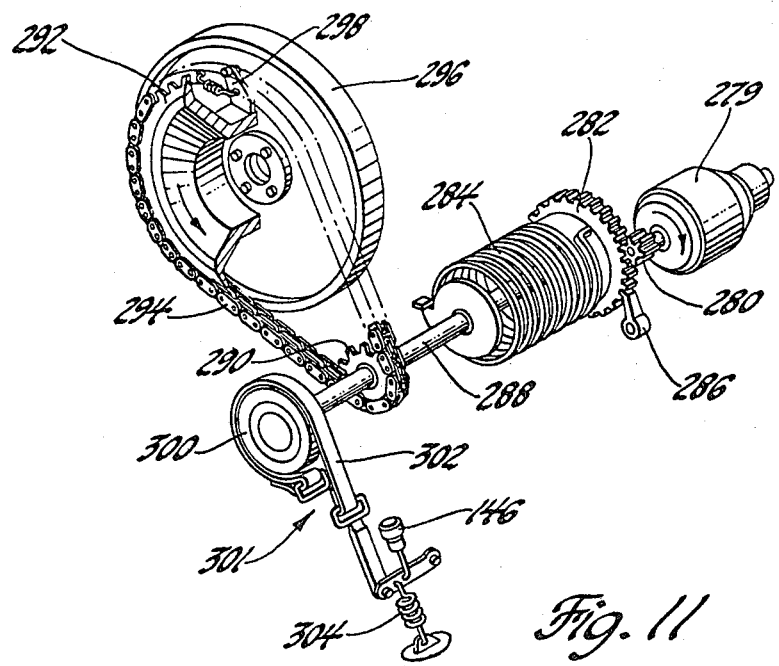
Figure 12:
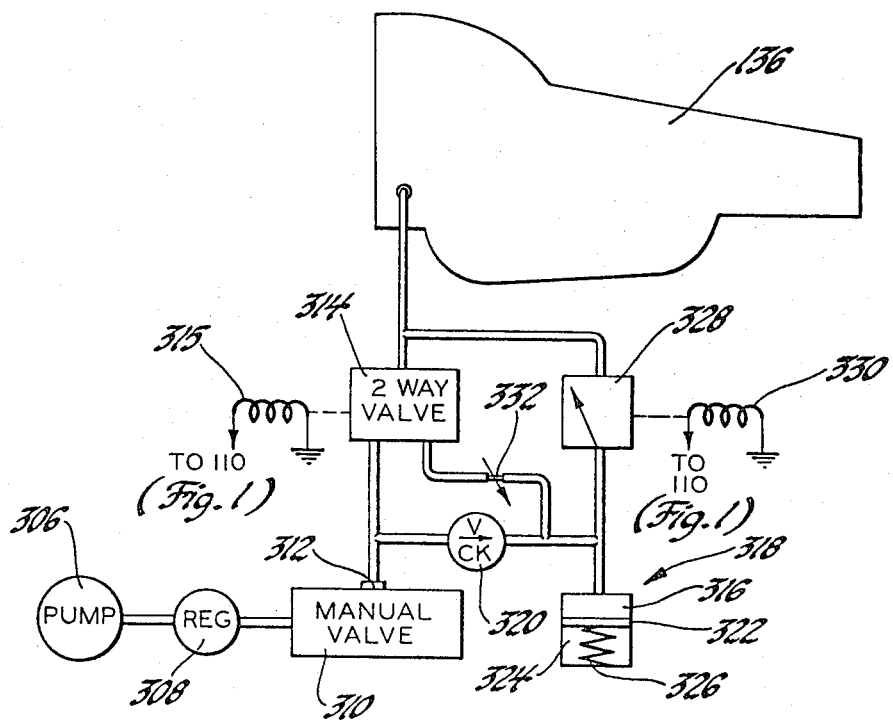

These and other objects of this invention may be best understood by reference to the following description of a preferred embodiment and the drawings in which:

FIG. 1 illustrates a digital system for controlling various engine functions including the automatic shutdown and restart system of this invention;

FIGS. 2 thru 10 are diagrams illustrative of the operation of the digital computer of FIG. 1 in controlling the engine in accord with the principles of this invention;

FIG. 11 is a diagram of the starter motor and spring assist therefor utilized in providing the engine restart of this invention; and FIG. 12 is a schematic diagram of a fluid control system for controlling the fluid input to the forward drive clutch of an automatic transmission for providing slow or rapid increase in the engagement force of the forward drive clutch.

Referring to FIG. 1, there is illustrated a digital controller responsive to various input signals for providing engine control functions including the automatic shutdown and restart function of this invention. The digital controller includes a microprocessor 100 which executes the various control functions by executing an operating program permanently stored in an external read only memory (ROM) 102. The ROM 102 may also contain lookup tables addressed in accord with engine operating parameters and which store control values such as fuel pulse width, spark swell time and spark ignition time relative to a reference pulse. Internal to the microprocessor 100 are conventional counters, registers, accumulators, flag flip-flops, etc. Such a microprocessor may take the form of a Motorola MC-6800 series microprocessor. The digital controller also includes a random access memory (RAM) 104 into which data may be temporarily stored and from which data may be read at various address locations determined in accord with the program stored in the ROM 102. A clock oscillator 106 supplies a clock signal to the microprocessor 100 which establishes the timing of the digital controller operation and supplies the clock signal to a divider 107 which issues a periodic interrupt pulse to a maskable interrupt A input of the microprocessor. These interrupt pulses may be, for example, at 12½ millisecond intervals.

A counter input/output circuit 108 is provided having an output counter section for providing timed pulse outputs such as for the control of fuel injectors and spark timing. In general, the output counter section of the counter input/output circuit 108 may include registers into which binary numbers representative of the desired pulse widths are periodically inserted. Thereafter, at times determined by the microprocessor 100 the numbers are gated into down counters which are clocked by clock pulses with the output pulses of the output counter section having durations equal to the time required for the down counters to be counted down to zero. In this respect, the output pulse may be provided by a flip-flop set when the number in the register is gated into the down counter and reset by a carry-out signal from the down counter when the number is counted to zero. The counter input/output circuit 108 also includes an input counter section which counts input pulses for a predetermined time period or, alternatively, counts clock pulses between input pulses to determine the frequency of input pulses for measuring, for example, engine speed or vehicle speed.

A discrete input/output circuit 110 is provided having an output discrete section for providing output discrete signals. For example, the output discrete section may include flip-flops set to provide an output signal to energize a solenoid and reset to deenergize the solenoid. The discrete input/output circuit 110 also includes an input discrete section for monitoring bi-level signals such as provided by switches.

To provide for the measurement of analog signals provided by various transducers, the digital controller includes a signal conditioner 112 which receives the analog signals and whose outputs are coupled to an analog-to-digital converter-multiplexer 114. The particular analog condition sampled and converted is controlled by the microprocessor 100 in accord with the operating program via address lines from the input/output interface of an input/output circuit 116. Upon command, the addressed condition is converted to digital form and supplied to the input/output circuit 116 and then stored in ROM designated memory locations in the RAM 104. The analog signals supplied to the signal conditioner represent various operating parameters of an internal combustion engine 118 and include an engine coolant temperature signal TEMP., an engine manifold absolute pressure signal MAP, a throttle position signal THP representing the angular position of the throttle blades 119 of the engine 118, and battery voltage BAT. These signals are provided by conventional transducers.

The input/output circuits 108, 110 and 116 are conventional circuits for providing the respective functions. While the circuits have been illustrated as being separate, they may be combined in one or more input/output interface circuits.

The microprocessor 100, the ROM 102, the RAM 104 and the input/output circuits 108, 110 and 116 are interconnected by an address bus, a data bus and a control bus. The microprocessor 100 accesses the various circuits and memory locations in the ROM 102 and the RAM 104 via the address bus. Information is transmitted between circuits via the data bus and the control bus includes conventional lines such as read/write lines, reset lines, clock lines, power supply lines, etc.

The fuel requirement of the internal combustion engine 118 is provided via a pair of fuel injectors 120 that are periodically energized by the output counter section of the input/output section 108 and an injector drive circuit 122. A spark timing signal is provided from an output port of the output counter section of the input/output circuit 108 to a switching transistor 124 connected with the primary winding 126 of an ignition coil 128. The secondary winding 130 of the ignition coil 128 is connected to the rotor contact of a distributor generally designated 132 which sequentially connects contacts in the distributor cap to respective spark plugs (not shown). The primary winding 126 of the ignition coil 128 is connected to the positive side of the vehicle battery 133 through an ignition switch 134. The transistor 124 is controlled to provide timed firing of the spark plugs of the engine 118. The transistor 124 is turned ON at a determined dwell time prior to a desired spark time and turned OFF at the desired spark time to fire the spark plug selected by the distributor.

Reference pulses indicative of engine crankshaft position and having a repetition rate proportional to engine speed are supplied by the distributor 132. In this respect, the distributor 132 may include an electromagnetic or electro-optical transducer responding to rotation of the distributor shaft to provide a train of pulses each occurring at a predetermined angle such as piston top dead-center position. For example, in an 8-cylinder engine, a reference pulse is provided every 90 degrees of crankshaft rotation. These reference pulses are supplied to a non-maskable interrupt input B of the microprocessor 100 which utilizes the pulses for spark timing and fuel injection timing.

Pulses having a frequency representing engine speed are provided by a speed pickup 135 which monitors rotation of the flywheel of the engine 118 and provides pulses to the input counter section of the input/output circuit 108. Pulses having a frequency representing vehicle speed are provided to the input counter section of the input/output circuit 108 by means of a speed transducer monitoring the rotation of the output shaft of an automatic transmission 136 of the vehicle. The vehicle speed transducer may take the form of an electromagnetic sensor.

A normally open door switch 138 has one side coupled to the positive terminal of the vehicle battery 133 and the other side coupled to one input of the input discrete section of the input/output circuit 110. This door switch may be the conventional door switch that is closed upon opening of the doors to energize the vehicle courtesy lights. A manually operable, normally open switch 139 which may take the form of the vehicle cruise control engage switch is also coupled between the positive terminal of the battery 133 and one input of the input discrete section of the input/output circuit 110.

The output of a switch 140 coupled with the gear shift linkage of the vehicle transmission 136 is coupled to one input of the input discrete section of the input/output circuit 110, the switch providing a positive signal to the circuit when the transmission gear selector is not in $L_1$ or $L_2$. A signal is also provided to the input discrete section of the input/output circuit 110 from the ignition switch 134 when placed in the start position for energizing the starter solenoid winding 142 of the vehicle starter motor or when the starter solenoid 142 is energized via the output discrete section of the input/output circuit 110.

When the conditions exist for automatic shutdown of the vehicle engine, the microprocessor 100 terminates the fuel injection pulses to the drivers 122 to terminate fuel flow except during an engine manifold priming period in accord with this invention where fuel injection pulses are provided while the ignition pulses are inhibited. When the conditions exist for an automatic restart of the vehicle engine 118, an output discrete is provided by the output discrete section of the input/output circuit 110 to a driver circuit 144 for energizing the starter motor solenoid 142 and for energizing a spring brake release solenoid winding 146. The spring brake release winding releases a spring for assisting restart of the vehicle engine 118. Additionally the output discrete section of the input/output circuit 110 supplies discrete signals to the transmission 136 for controlling slow and fast fluid fill valves for controlling the rate the chamber in the forward drive clutch is filled with fluid depending upon whether the vehicle operator has initiated a standing start or a drive-away start.

Figure 2:
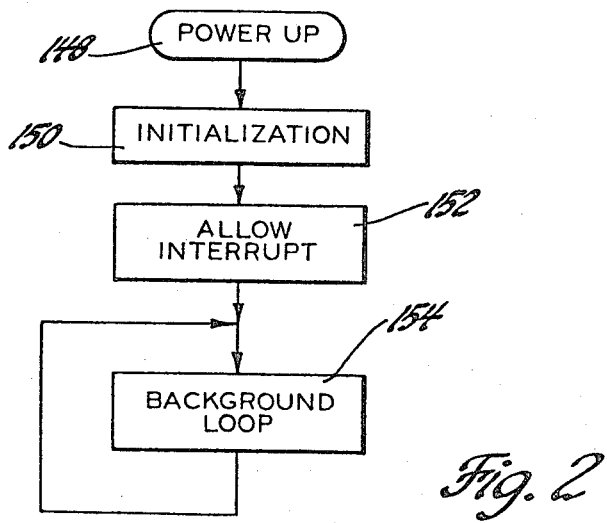

Referring to FIG. 2, when the ignition switch 134 is first operated to energize the starter solenoid 142 to initiate manual start of the engine 118 and to apply power to the various circuits, the computer program is initiated at point 148 when power is first applied and then proceeds to step 150 where the computer provides for initialization of the system. For example, at this step, system initial values stored in the ROM 102 are entered into ROM designated locations in the RAM 104 and counters, flags and timers are initialized. After the initialization step 150, the program proceeds to step 152 wherein the program allows interrupts to occur such as by resetting the interrupt mask bit in the microprocessor condition code register. After step 152, the program shifts to a background loop 154 which is continuously repeated. The background loop may include execution of control routines such as EGR control and may also include the execution of routines such as diagnostic and warning routines.

While the system may employ numerous program interrupts at various spaced intervals, it will be assumed for purposes of illustrating this invention that an interrupt A is provided at $12\frac{1}{2}$ millisecond intervals by means of the divider 107 of FIG. 1. A second interrupt B is also provided in response to the reference pulses provided by the distributor 132 as previously described.

Figure 3:
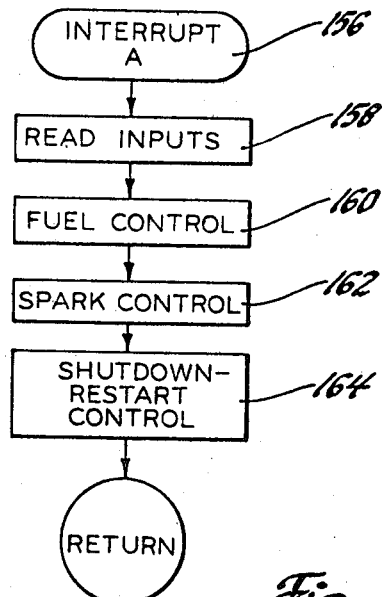

Referring to FIG. 3, the interrupt A routine that is repeated at $12\frac{1}{2}$ millisecond intervals is illustrated. The routine is entered at point 156 and proceeds to step 158 where the computer executes a read routine where the discrete inputs to the input discrete section of the input/output circuit 110 are stored in ROM designated memory locations in the RAM 104, the engine speed and vehicle speed determined via the input counter section of the input/output circuit 108 are stored at ROM designated memory locations in the RAM 104 and the various inputs to the analog-to-digital converter-multiplexer 114 are one by one converted by the analog-to-digital converter-multiplexer 34 into binary numbers representative of the analog signal values and stored in respective ROM designated memory locations in the RAM 104.

The program next executes a fuel control routine at step 160. During this routine, which will be described in greater detail with respect to FIG. 9, the desired fuel injection pulse width for energizing the fuel injectors 120 is determined and placed in a fuel control register in the output counter section of the input/output circuit 108. Following the fuel control routine 160, the program proceeds to a step 162 where a spark control routine is executed for determining the desired dwell and spark timing values relative to the reference pulses provided by the distributor 132. The determined spark timing value is a number representing the time from the reference pulse provided by the distributor 132 which when added to the determined dwell time represents the desired spark advance angle before the next reference pulse. This spark timing value is inserted into a spark timing control register in the output counter section of the input/output circuit 108 and the dwell time value is inserted into a dwell control register in the circuit 108. Alternatively, spark timing may be provided by a programmed engine control unit in cooperation with the microprocessor 100 as illustrated in U.S. Pat. No. 4,231,091 issued to Phillip R. Motz and which is assigned to the assignee of this invention.

At step 164, the shutdown-restart control routine of this invention is executed after which the program returns to the background loop 154 of FIG. 2. The interrupt A routine of FIG. 3 is repeated at 12½ millisecond intervals as determined by the clock 106 and divider 107 of FIG. 1.

Figure 4:
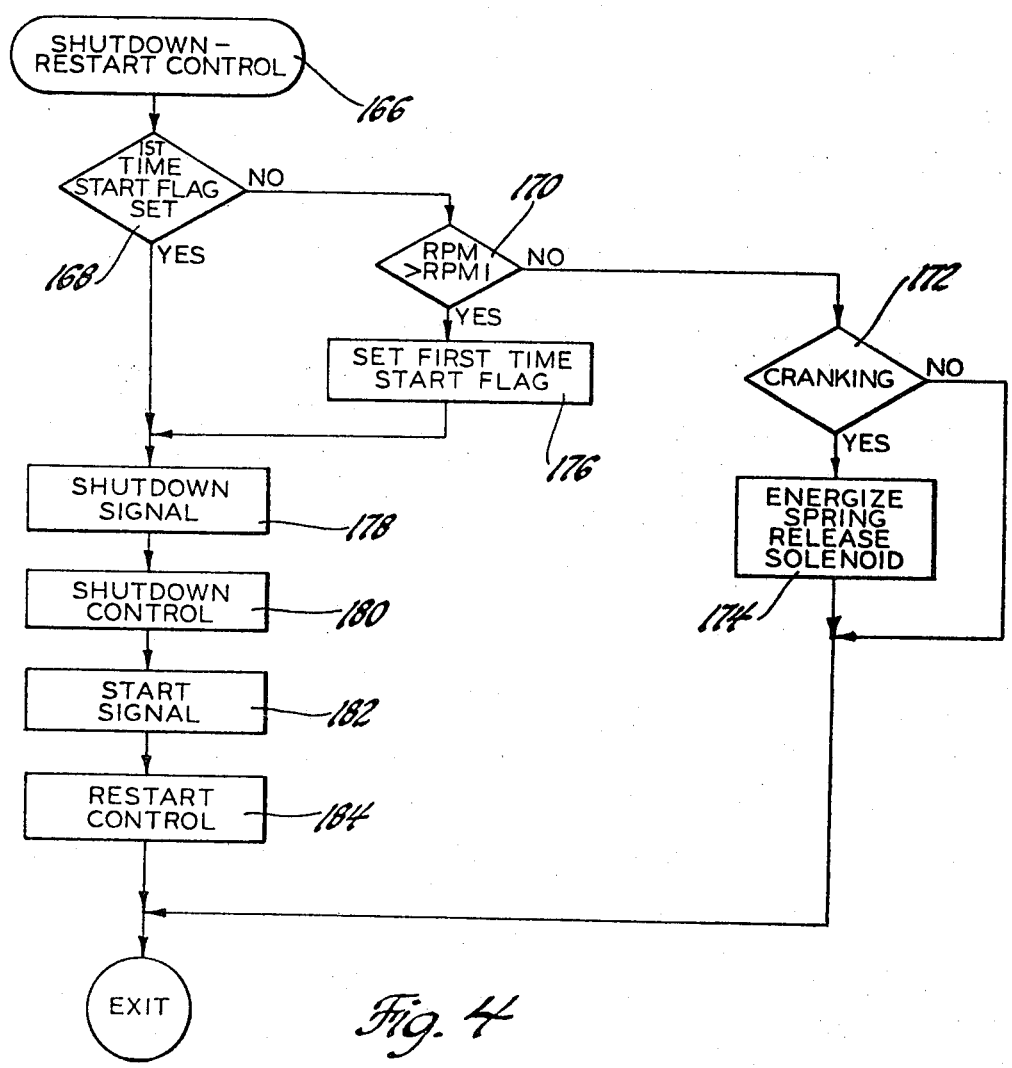

Referring to FIG. 4, the shutdown-restart control routine 164 repeated at 12½ millisecond intervals during the interrupt A routine is illustrated. The shutdown-restart control routine is entered at point 166 and proceeds to determine whether or not the vehicle engine has initially been manually started, the automatic shutdown and restart function being inhibited until the vehicle operator has first manually started the engine 118 after he first enters the vehicle. This is determined beginning at decision point 168 where the state of a first time start flag is sampled. This flag is initially reset during the initialization step 150 of FIG. 2 so that it is initially reset prior to the starting of the engine 118. Assuming the first time start flag is reset indicating the engine has not been manually started, the program proceeds to a decision point 170 where the engine speed stored at step 158 of FIG. 3 is compared with a reference speed RPM1 which is greater than the cranking speed but less than the idle speed of the engine. An engine speed greater than this reference speed represents the engine has been started. If the engine speed is less than the reference speed indicating the engine has not started, the program proceeds to a decision point 172 where it is determined whether or not the engine is cranking as represented by the input discrete stored at step 158 from the output of the ignition switch 134. If the engine is cranking, the spring release solenoid 146 is energized at step 174 via the output discrete section of input/output circuit 110 to allow cranking of the engine. Thereafter, the program exits the shutdown-restart control routine. Returning to step 172, if the engine is not cranking, the program exits the shutdown-restart control routine 166. As long as the engine has not been manually started when the operator first enters the vehicle, automatic shutdown and restart is bypassed by the program steps 168 through 174 as described during each interrupt period.

If, when the program returns to decision point 170, the engine is started as represented by the engine speed being greater than the reference speed RPM1, the program proceeds to step 176 where the first time start flag is set to indicate that the vehicle engine has been started manually by the vehicle operator. Thereafter and following the step 168 during each subsequent execution of the shutdown-restart control routine 164, the program proceeds to a step 178 where a shutdown signal routine is executed. During this routine, the program determines if the conditions exist for automatic shutdown of the vehicle engine. Following step 178, the program proceeds to the step 180 where the engine 118 is shut down by execution of a shutdown control routine if the shutdown signal routine step 178 determined that the conditions exist for automatic engine shutdown. During this routine, the engine is primed to provide immediate restart capability in accord with this invention. Following the step 180, the program proceeds to step 182 where a start signal routine is executed. During this routine, the program determines if the conditions exist for automatic restart of the vehicle engine. Thereafter, the program proceeds to step 184 where the engine is restarted by execution of a restart control routine if the start signal routine step 182 determined that the conditions exist for automatic engine restart. Following step 184, the program exits the shutdown-restart control routine.

Figure 5:
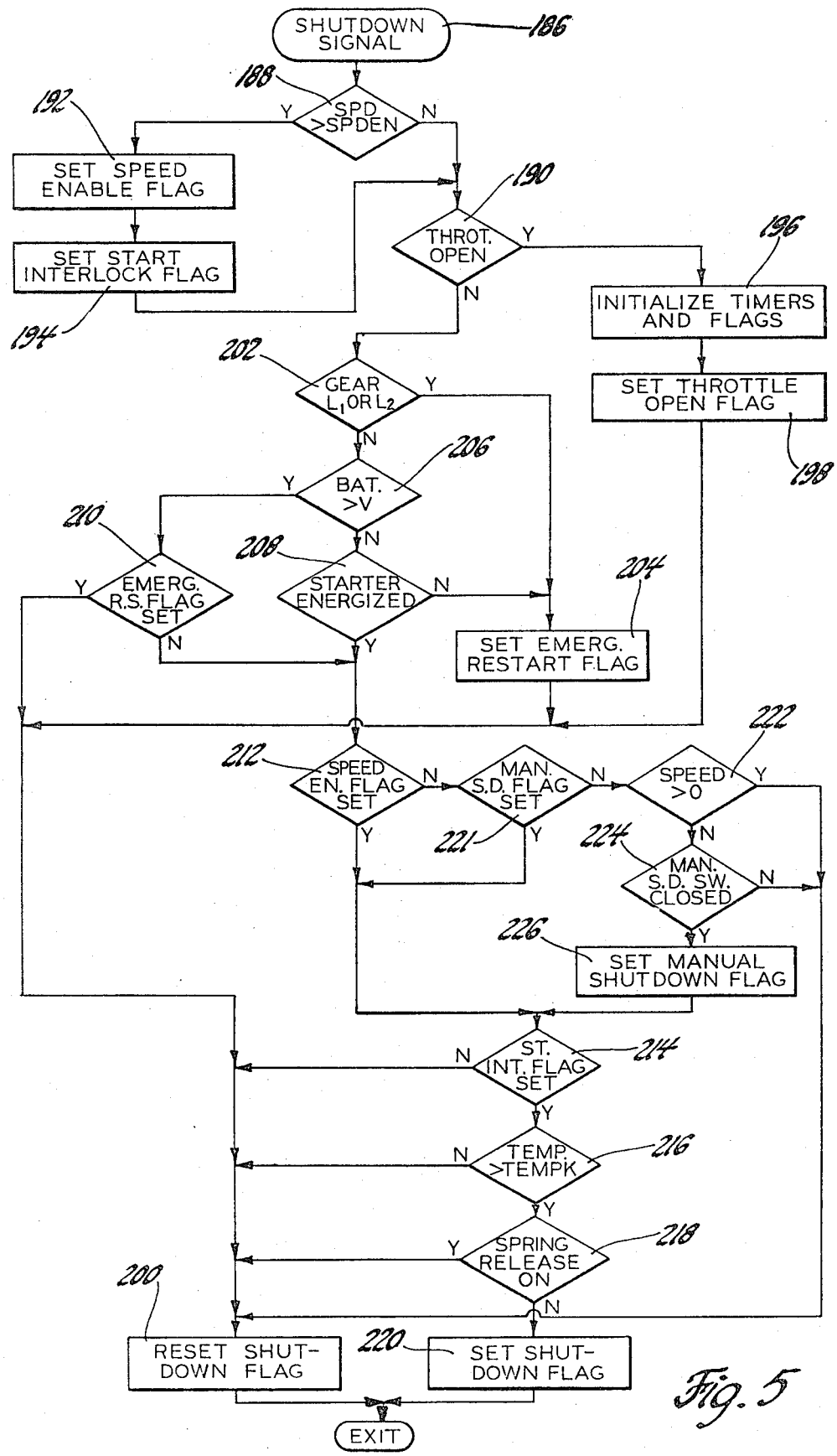

Referring to FIG. 5, the shutdown signal routine 178 of FIG. 4 is illustrated. In general, the shutdown signal routine sets a shutdown flag to initiate an automatic vehicle engine shutdown if the vehicle is first driven to a calibration speed SPDEN, the throttle is then closed, the transmission 136 gear selector is not in $L_1$ or $L_2$, the vehicle battery is charged and the engine temperature has attained a warmed-up temperature TEMPK. The calibration speed SPDEN represents an "arming" speed above which the system is thereafter enabled to automatically shut down the vehicle engine. This presents the system from repeatedly shutting down and restarting the engine during certain vehicle maneuvers such as parking maneuvers where the vehicle throttle is repeatedly opened and closed. The warmed-up temperature TEMPK represents a temperature above which it is assumed that the vehicle engine may be readily restarted and below which engine starting may be more difficult thereby making automatic shutdown and restart undesirable.

Even though the system has not been enabled by the vehicle attaining the calibration speed SPDEN, if the remaining conditions including a closed throttle, the transmission being in drive, and the engine being warmed up are met, an automatic shutdown may be initiated manually by the vehicle operator closing the manual shutdown switch 139. This switch may be the cruise control switch conventionally used to enable cruise control or alternatively may be a separate shutdown switch.

The shutdown signal routine is entered at point 186 and then proceeds to a decision point 188 where the vehicle speed stored at step 158 is compared with the calibration speed SPDEN stored in the ROM 102. If this vehicle speed has not yet been reached, the program proceeds to a decision point 190. However, if the vehicle has been driven to the speed SPDEN, the program proceeds from step 188 to a step 192 where a speed enable flag is set to enable an automatic shutdown to proceed and to step 194 where a start interlock flag is set. The start interlock flag is utilized as will be described to prevent an automatic restart of the vehicle engine 118 in response to a throttle opening movement if, after automatic shutdown, the vehicle operator exits the vehicle.

Following the step 194, the program proceeds to the decision point 190. At step 190, the condition of the throttle valve represented by the throttle position signal stored at step 158 is determined. If the throttle valve is open, the program proceeds to a step 196 where various timers utilized in the automatic shutdown and restart control are initialized and various flags are initialized to desired states. Thereafter, the program proceeds to a step 198 where a throttle open flag is set to indicate that the vehicle throttle is open. Following step 198, the program proceeds to a step 200 where a shutdown flag is reset to indicate that one of the conditions (closed throttle) is not met for providing automatic shutdown of the vehicle engine 118.

If it is determined at decision point 190 that the throttle valve is closed, the program proceeds to a decision point 202 where the condition of the transmission gear switch 140 of FIG. 1 is determined. If it is determined that the vehicle gear selector is in $L_1$ or $L_2$, the program proceeds to a step 204 where an emergency restart flag is set to force an engine restart as will be described. Additional parameters may also be monitored to force an engine restart. For example, the emergency restart flag may be set if the power steering pressure is below a predetermined value or if the power brake pressure is below a predetermined value. Following the step 204, the program proceeds to the step 200 where the shutdown flag is reset to indicate that one of the conditions (transmission in drive gear) is not met for automatic shutdown of the engine.

If the vehicle is in drive gear, the program proceeds to a decision point 206 to determine whether or not the battery voltage is greater than a predetermined value V representing a charged battery. If the battery voltage is low, the program proceeds to a step 208 where it is determined whether or not the starter is energized. If the starter is energized, it can be assumed that the battery voltage is low as a result of the high power requirements for starting the vehicle engine. However, if the starter is not energized, the low battery voltage is indicative of a low battery charge and the program proceeds to the step 204 where the emergency restart flag is set and then to step 200 where the shutdown flag is reset to indicate that one of the conditions (battery charged) is not met for automatic shutdown of the engine.

If the battery voltage is greater than the value V, the program proceeds from decision point 206 to a decision point 210 where the state of the emergency restart flag is sampled. If the emergency restart flag is set, the program proceeds directly to the step 200 where the shutdown flag is reset to inhibit automatic shutdown.

From decision points 208 and 210, the program proceeds to a decision point 212 where the state of the speed enable flag is sampled. If the vehicle was driven to the speed SPDEN and the speed enable flag was set at step 192, the program proceeds to decision point 214 where the start interlock flag is sampled. If the start interlock flag is set indicating the vehicle operator has not exited the vehicle after the flag was set at step 194, the program proceeds to decision point 216 where the temperature of the vehicle is compared with the value TEMPK. If the engine is warm as required to enable an automatic shutdown of the engine, the program proceeds to a decision point 218 where the condition of the spring release solenoid 146 is determined. If the spring release solenoid is deenergized, all of the conditions now exist for providing an automatic shutdown of the vehicle engine 118 and the program proceeds to step 220 where the shutdown flag is set to enable automatic engine shutdown. If the conditions sampled at steps 214, 216 and 218 are indicative of conditions where it is not desirable to provide for automatic shutdown of the vehicle engine, the program proceeds to the step 200 where the shutdown flag is reset. For example, if the start interlock flag is reset indicating that the vehicle operator has opened the door, the shutdown flag is reset. Further, if the vehicle engine is cold or the spring release of the starter motor spring assist is on, the program proceeds to reset the shutdown flag to inhibit automatic shutdown of the vehicle engine.

Even though at step 212 it is determined that the vehicle has not previously attained the speed SPDEN, the engine may be shut down if the vehicle is at rest by the vehicle operator momentarily closing the switch 139 of FIG. 1. For example, in traffic conditions where the vehicle has not been driven to the speed SPDEN, the vehicle operator may desire to manually enable automatic shut down of the vehicle engine when the vehicle is brought to a stop at an intersection to accomplish the advantages previously noted, namely, improved fuel economy and improved emissions. If the program determines the vehicle speed SPDEN had not been reached, the program routine then proceeds to determine if the operator has commanded an automatic shutdown. The program first samples the state of a manual shutdown flag at step 221 which was reset at step 150 of FIG. 2 and at step 196 any time the throttle is open. The manual shutdown flag indicates a manual shutdown command when set. If this flag is reset, the program proceeds to decision point 222 to determine whether or not the vehicle is at rest. If the vehicle is moving, the manual command of an automatic shutdown of the vehicle engine is inhibited and the program proceeds to step 200 where the shutdown flag is reset to prevent shutdown of the vehicle engine 118. However, if the vehicle is at rest, the program proceeds to the decision point 224 where the state of the manual shutdown switch 139 is sampled. If the switch is open, the program proceeds to the step 200. However, if the switch is closed representing a command to shut down the vehicle engine, the program proceeds to set the manual shutdown flag at step 226. From step 226 and during the next interrupt A routine, and assuming the conditions at decision points 214 through 218 are otherwise met for providing automatic shutdown, the shutdown flag is set at step 220 to enable engine shutdown. Following the steps 200 and 220, the shutdown signal routine is exited.

Figure 6:
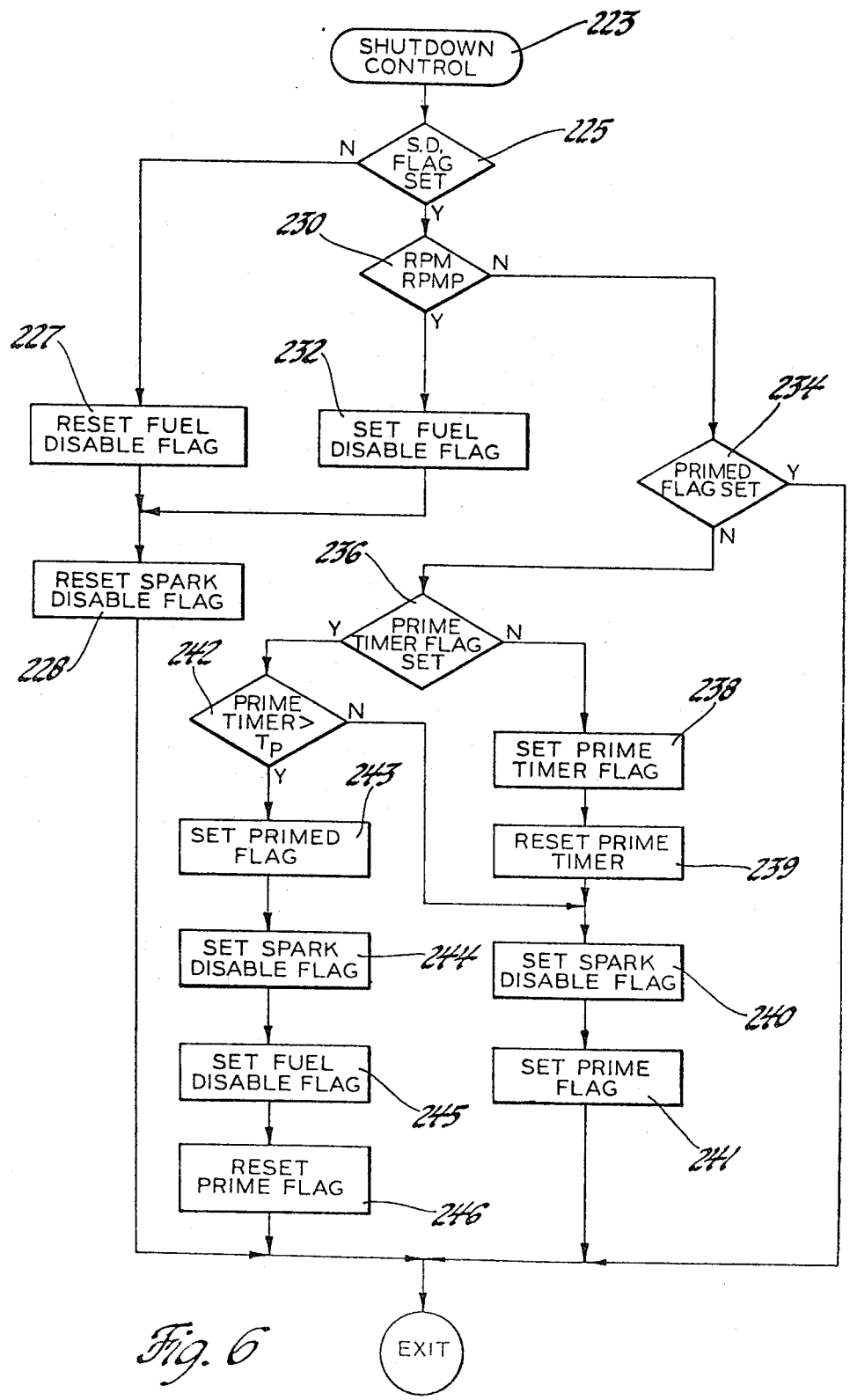

Following the shutdown signal routine 178, the program executes the shutdown control routine 180 which is illustrated in FIG. 6. This routine controls the automatic shutdown of the vehicle engine when the shutdown flag is set (FIG. 5) indicating that all the conditions are met for automatic shutdown.

In general, the shutdown control routine shuts down the vehicle engine 118 by disabling the fuel flow. During the period that residual fuel in the manifold is being drawn into the combustion chambers, the spark control is operated as normal to allow combustion of the mixture. When the engine rotation is stopped, the engine intake space would normally only contain air without fuel. This would make a subsequent restart more difficult by at least increasing the start time while the intake manifold is again filled with a combustible air-fuel mixture. In accord with this invention, to alleviate this condition and to provide for an immediate restart without delay, the shutdown control routine of FIG. 6 also provides for the priming of the intake manifold of the engine 118 just prior to cessation of engine rotation during the engine shutdown so that when the engine rotation is fully stopped, the intake manifold is filled with a fuel and air mixture so that a combustible mixture is immediately drawn into the combustion space for ignition when the engine restart is initiated. The priming of the intake manifold is accomplished by re-enabling the fuel flow to the engine for a timed period when the engine speed has decreased to a predetermined low level during engine shutdown while at the same time disabling the ignition system to inhibit ignition of any combustible mixture that may be drawn into the combustion space.

The shutdown control routine is entered at point 222 and proceeds to a decision point 224 where the condition of the shutdown flag is sampled. If the shutdown flag is reset indicating that all of the conditions have not been met for automatic shutdown of the vehicle engine, the program proceeds to reset a fuel disable flag at step 226 and a spark disable flag at step 228 and then exits the shutdown control routine. The fuel disable flag and the spark disable flag are both also reset during the initialization step 150 and, when reset, command normal engine operation.

If the shutdown flag is set, the program proceeds from step 224 to a decision point 230 where the engine speed is compared with a calibration speed RPMP representing a low engine speed such as 100 rpm at which time it is desired to initiate priming of the intake manifold with an air-fuel mixture for aiding a subsequent engine restart. If the engine speed is greater than the prime speed, the program proceeds to step 232 where the fuel disable flag is set to indicate that fuel flow to the internal combustion engine 118 is to be terminated to cause shutdown thereof. From step 232, the program proceeds to 228 where the spark disable flag is reset to indicate that normal spark is to be provided to insure combustion of all of the fuel-air mixture entering the combustion chambers during the shutdown period.

If the engine speed has decreased to the priming speed RPMP, the program proceeds from the decision point 230 to a decision point 234 where the state of a primed flag is sampled. This flag is reset during the initialization steps 150 and 196. If the primed flag is set indicating the engine has been fully primed, the program exits the shutdown control routine. However, if the primed flag is reset indicating the engine has not been primed, the program proceeds to a decision point 236 where a prime timer flag that is reset during the initialization steps 150 and 196 is sampled. If the prime timer flag is reset, it indicates that priming of the intake manifold has not been initiated and the program proceeds to a step 238 where the prime timer flag is set. At the next step 239, a prime timer clock register is reset. Thereafter, the spark disable flag is set at step 240 to indicate that the ignition system is to be disabled and a prime flag is set at step 241 to indicate that fuel is to be supplied to prime the intake manifold of the engine 118. Thereafter, the program exits the shutdown control routine.

During subsequent executions of the shutdown control routine, the program proceeds from the decision point 236 to a decision point 242 where the prime timer register is incremented and then compared with a calibration value $T_p$ representing the time for priming the intake manifold to fully charge the manifold with a combustible mixture of fuel and air. If the time $T_p$ has not yet expired, the program proceeds to the steps 240 and 241 to continue priming of the intake manifold. However, if the intake manifold has been primed for the calibration duration $T_p$, the program proceeds to the step 243 where the primed flag is set.

After step 243, the program proceeds to step 244 where the spark disable flag is set to indicate that the ignition system is to be maintained disabled so that if the engine has not yet ceased rotation, ignition of a combustible mixture drawn into the combustion chambers is prevented. From step 244 the program proceeds to step 245 where the fuel disable flag is again set to indicate that the flag supply is to be disabled and then to step 246 where the prime flag is reset to terminate engine priming. Following step 246, the program exits the shutdown control routine. During subsequent executions of the shutdown control routine, the program exits directly from the decision point 234 since the primed flag was previously set at step 243.

Figure 7:
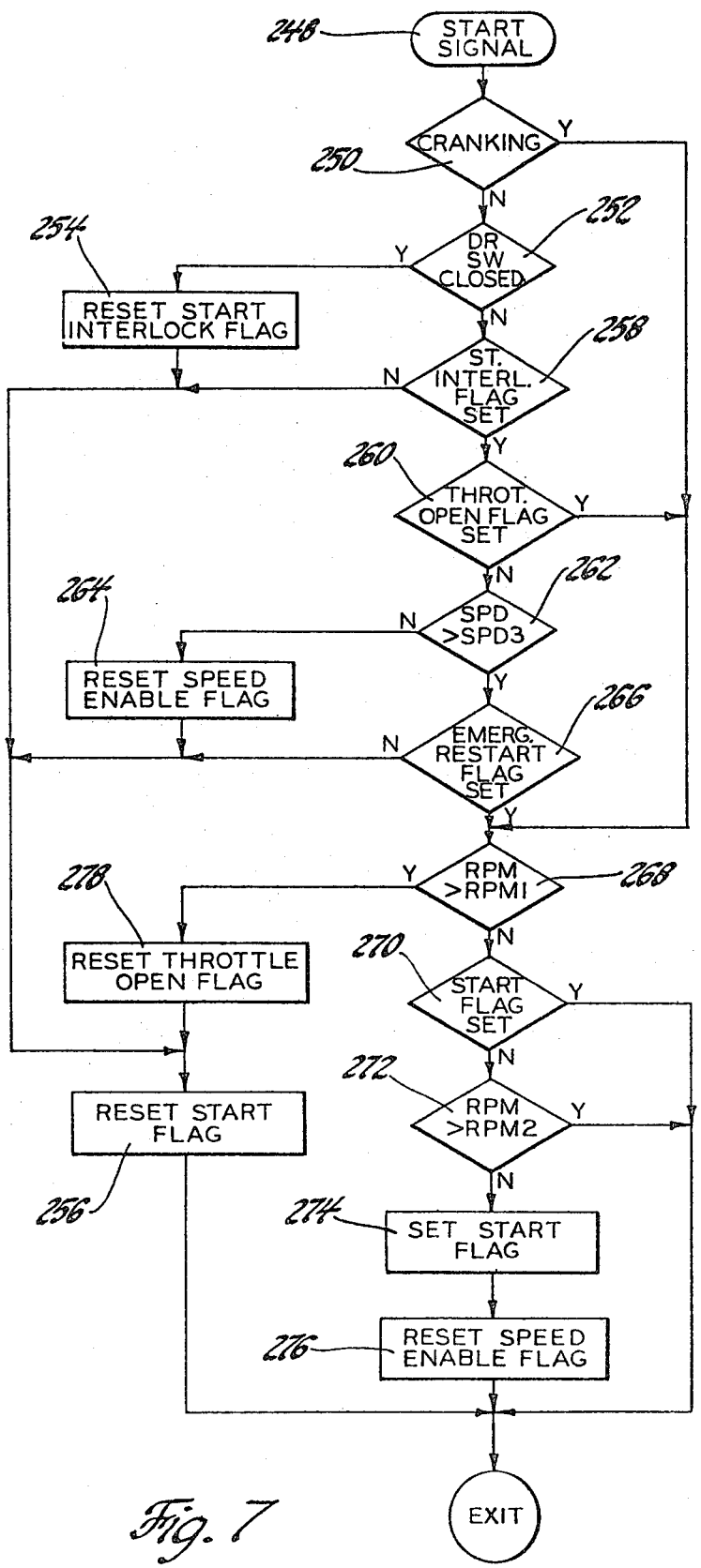

After the vehicle engine has been shut down by the shutdown signal and shutdown control routines 178 and 180 in response to the vehicle operator closing the throttle valves 119, the start signal routine 182 of FIG. 4 and which is illustrated in FIG. 7 determines when the conditions exist to initiate an automatic restart of the engine 118. In general, a restart command is provided by the start signal routine when the vehicle operator opens the throttle valves 119 if the operator has not exited the vehicle as represented by the closing of the door switch 138. Further, a restart is not initiated unless the engine speed is less than a low speed such as 50 rpm.

Referring to FIG. 7, the start signal routine is entered at point 248 and proceeds to a decision point 250 to determine whether or not the starter motor is energized to crank the vehicle engine. If the starter motor is not already energized, the program proceeds to step 252 to determine whether the door switch 138 is closed. If closed, the program resets the start interlock flag 254 after which a start flag is reset at step 256 to inhibit an automatic restart. Thereafter, even though the door switch 138 is opened, the program proceeds from a decision point 258 which samples the start interlock flag to step 256 so that the engine cannot be automatically restarted. If the vehicle operator has not left the vehicle, the program proceeds from steps 252 to 258 to a decision point 260 where the condition of the throttle open flag is sampled. This flag is set when the vehicle operator opens the vehicle throttle at step 198 of FIG. 5 and represents the operator input to initiate engine restart. If the throttle has not been opened, the program proceeds to a decision point 262 where the vehicle speed is compared with a calibration speed SPD3 representing a minimum vehicle speed for an emergency engine restart. If the vehicle speed is less than the calibration speed, the program proceeds to a step 264 where the speed enable flag is reset and to step 256 where the start flag is reset.

If the vehicle speed is greater than the reference speed SPD3, the program proceeds from point 262 to the decision point 266 where the condition of the emergency restart flag is sampled. If an emergency restart is not required (emergency flag reset), the program proceeds to step 256 to reset the start flag. However, if the emergency restart flag was set at step 204 of FIG. 5 indicating a condition exists requiring an emergency restart, the throttle open flag is set as determined at step 160, or if the starter motor is energized to crank the engine as determined at step 250, the program proceeds to the decision point 268 where the engine speed is compared with the reference speed RPM1 which is greater than the cranking speed of the vehicle engine but less than the idle speed. If the engine speed is less than RPM1 indicating the engine is not started, the program proceeds to a decision point 270 where the condition of the start flag is sampled. When set, the start flag indicates an engine restart command and the program exits the start signal routine. However, if the start flag is reset indicating the conditions have not been met for an automatic restart, the program proceeds to a decision point 272 where the engine speed is compared with a calibration speed RPM2 representing a value of engine speed such as 50 rpm above which it is not desired to initiate cranking of the vehicle engine. If the engine speed is above this value, the program exits the start signal routine. However, if the engine speed is below this value, the conditions are met for an automatic restart and the program proceeds to step 274 where the start flag is set to command an automatic restart. Thereafter the program proceeds to step 276 where the speed enable flag is reset thereafter requiring the vehicle to again be driven to the calibration speed SPDEN before an automatic shutdown is again enabled. The program then exits the start signal routine.

When the engine speed is greater than the calibration value RPM1 indicating the engine is running, the program proceeds from the decision point 268 to the step 278 where the throttle open flag is reset. This flag is set at step 198 of FIG. 5 during the shut-down-restart control routine when the throttle is open and reset at step 278 of FIG. 7 each time the start signal routine is executed when the vehicle engine is running. However, the throttle open flag is not reset if the engine is not running. This provides the capability for the operator to touch and then release the throttle to initiate a standing restart of the engine.

Figure 8:
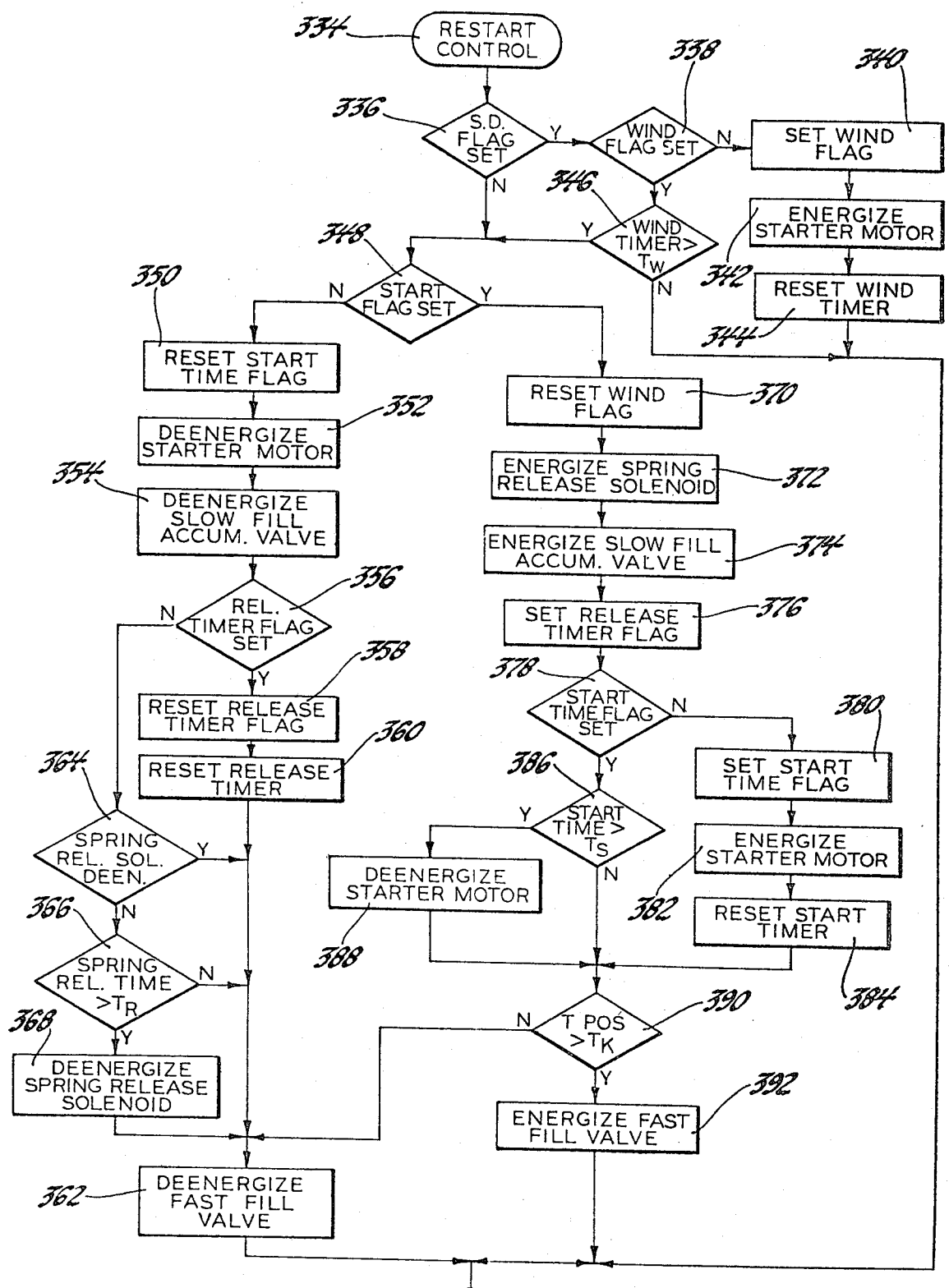

Automatic restart of the engine 118 is provided by the restart control routine illustrated in FIG. 8 in response to a restart command provided by the start signal routine of FIG. 7. The restart control routine also controls the rate of transmission fluid flow into the fluid chamber in the forward drive clutch in the automatic transmission to control the rate of increase of the engagement force of the forward drive clutch for a standing start or a driveaway start. The restart control routine also controls the winding and release of a starter motor assist spring.

The starter motor assist spring and its relationship to the engine starter motor and the engine 118 is illustrated in FIG. 11. Referring to this figure, the starter motor 278 is energized by the starter solenoid 142 of FIG. 1 and includes an output drive gear 280 engaging a driven gear 282 secured to one end of a spring 284. A ratchet member 286 serving as a one-way brake engages the teeth of the driven gear 282. The other end of the spring 284 is drivingly secured to a shaft 288. A sprocket 290 is mounted on the shaft 288 for rotation therewith and drives a sprocket 292 via a drive chain 294. The sprocket 292 is mounted adjacent to the engine flywheel 296 for relative motion thereto around a common axis. An overrun clutch 298 provides coupling between the sprocket 292 and the flywheel 296 when the sprocket rotational speed is greater than the flywheel speed such as during starting of the vehicle engine and allows the flywheel 296 to overrun the sprocket 292 when the engine speed becomes greater than the speed of the sprocket such as when the engine is running.

A friction wheel 300 of a brake 301 is mounted on the end of the shaft 288 and has a friction surface engaged by a band 302 which, when tightened around the friction surface of the friction wheel 300 locks the shaft 288 against rotation. The brake 301 is normally applied by the force of a spring 304 to lock the shaft 288 against rotation. In order to drive the sprocket 292 to initiate starting of the engine, the brake release solenoid 146 previously referred to with respect to FIG. 1 is energized to release the brake 301 to allow rotation of the shaft 288. The spring 284 can be wound to store energy by deenergizing the solenoid 146 to engage the brake 301 and energizing the starter motor 279 to rotate the gear 282 for a timed period. Thereafter, by energizing the solenoid 146, the energy in the spring 284 is released to rotate the sprocket 292 and the flywheel 296 through the overrun clutch 298 to provide for starting of the vehicle engine 118.

Referring to FIG. 12, the fill of the forward drive clutch in the automatic transmission 136 is controlled in accord with either a vehicle operator commanded standing start or a vehicle operator commanded driveaway start. The transmission 136 may take the form of the transmission illustrated in U.S. Pat. No. 3,847,179 assigned to the assignee of this invention. The forward drive clutch of the automatic transmission 136 is conventional in nature and functions as a fluid engageable drive-establishing means between the engine and the output shaft of the transmission 136. The engagement force varies with the fluid pressure applied thereto. The elements of FIG. 12 are illustrated as being external to the transmission 136 for illustration purposes only. Typically, all of those elements would be within the transmission housing.

The fluidic circuit of FIG. 12 includes a transmission fluid drive pump 306 supplying fluid under pressure to a pressure regulator 308. The output of the regulator 308 is fluid at a regulated pressure which is supplied to a manual shift valve 310. This valve is manually operable between various positions which include park, reverse, neutral, drive, intermediate and low. When in the drive position, the manual valve 310 directs the fluid under pressure to an output drive port 312 and to the chamber in the forward drive clutch through the normal closed input of an electromagnetically operated two-way valve 314. The two-way valve 314 is operated by a winding 315 and is normally biased to a deenergized position to provide fluid communication between the drive port 312 and the fluid chamber in the forward drive clutch in the transmission 136. The output of the drive port 312 is also coupled to the chamber 316 of an accumulator 318 through a check valve 320. The accumulator 318 includes a piston 322 slidably disposed in a housing 324 and which is moved by the fluid under pressure from the drive port output 312 of the manual shift valve 310 against the return force of a spring 326. The fluid in the accumulator chamber 316 is coupled to the chamber of the forward drive clutch through a fluid passage including an electromagnetic valve 328. The valve 328 is normally biased open and is closed to provide fluid communication between the accumulator 318 and the forward drive clutch in the transmission 136 by energization of a winding 330. The accumulator chamber 316 is also coupled to the fluid chamber in the forward drive clutch in the transmission 136 through the normally closed input of the two-way valve 314 through a fluid restriction or orifice 332. When the winding 315 is energized, fluid communication is established between the accumulator chamber 316 and the forward drive clutch of the transmission 136 through the orifice 332.

When the engine 118 is running, the manual shift valve 310 is in the drive position, and the windings 315 and 330 are deenergized, the forward drive clutch in the transmission 136 is pressurized by the pressurized fluid provided through the valve 314 from the drive port output of the manual shift valve 310. The accumulator 318 is also charged with fluid through the check valve 320 to the regulated pressure output of the regulator 308. When the engine is thereafter shut down, the accumulator 318 is maintained charged with fluid under pressure. If the winding 315 is then energized along, the chamber of the forward drive clutch is slowly filled by the pressurized fluid in the accumulator 318 at a rate determined by the orifice 332 and the spring 326 to provide a slowly increasing engagement force of the forward drive clutch. If, however, both of the windings 315 and 330 are energized, the chamber of the forward drive clutch is rapidly filled by the pressurized fluid in the accumulator 318 due to the unrestricted fluid coupling through the valve 328 in parallel with the restricted fluid coupling through the orifice 332 and the valve 314 to provide a rapid increase in the engagement force of the forward drive clutch. The windings 315 and 330 are controlled by the restart control routine of FIG. 8 in accord with a driver input representing either a commanded standing start or a commanded driveaway start to control the rate of increase in the engagement force of the forward drive clutch.

Referring to FIG. 8, the restart control routine is entered at point 334 and proceeds to sample the shutdown flag at step 336. When the shutdown flag is first set to command an automatic shutdown, the spring 284 of FIG. 11 is wound to store energy for assisting a subsequent engine restart. This is accomplished by the program steps 338 through 346. At step 338, a wind flag which was initialized to a reset condition at steps 150 of FIG. 2 and 196 of FIG. 5 while the throttle is open is sampled. When reset, the wind flag indicates the winding of the spring 284 has not been initiated and the program proceeds to step 340 where the wind flag is set and then to step 342 where the starter motor solenoid is energized to energize the starter motor 278. At step 344, a wind timer register is reset after which the program exits the restart routine. During the next interrupt period, the program then proceeds from step 338 to the step 346 where the wind timer register is incremented and compared with a calibration time $T_W$ representing the time required to wind the spring 284 the desired amount. If the time has not yet expired, the program exits the restart control routine. However, if the time has expired or if at step 336 it is determined that the shutdown flag is reset, the program proceeds to a decision point 348 where the start flag is sampled to determine whether or not there is a command to restart the engine. Assuming the start flag is reset indicating the conditions do not exist for an automatic restart, the program proceeds to a step 350 where a start time flag is reset. This flag is utilized in limiting the time that the starter motor can be energized during the period of an automatic restart as will be subsequently described. The program next proceeds to step 354 where the starter motor solenoid 142 is deenergized. It will be recalled that the starter motor was energized at step 342 to wind the spring 284 when the shutdown flag was first set. The starter motor is deenergized at step 352 at the end of the timed period $T_W$.

The program then proceeds to a step 354 where the slow fill accumulator valve 314 is deenergized to couple the output drive port 312 of the manual shift valve 310 to the forward drive clutch input of the automatic transmission 136. The fast fill accumulator valve 328 is also deenergized at this time and the accumulator 318 is charged with fluid under pressure through the check valve 320. Therefore, during the period that the engine is running and thereafter shut down, the chamber 316 of the accumulator is filled and remains filled with fluid under pressure.

Following step 354, the program proceeds to a decision point 356 where a spring release timer flag is sampled. This flag is set as will be described each time the vehicle engine start is initiated and causes the spring release solenoid 146 to be energized to release the spring 284 to insure that it is fully unwound with each start attempt. If the spring release timer is set, the program proceeds to a step 358 where the spring release timer flag is reset and to step 360 where a spring release timer register is reset. Thereafter, the fast fill valve 328 of FIG. 12 is deenergized (if not already deenergized) at step 362 to maintain the accumulator 318 charged with fluid under pressure. During the next execution of the restart control routine, the program proceeds from the decision point 356 to a decision point 364 where the condition of the spring release solenoid is determined. If the solenoid is energized, the program proceeds to step 366 where the spring release timer register is incremented and compared with a predetermined calibration time $T_R$ that is at least the maximum time required for the spring 284 to unwind. If the time has not expired, the program proceeds to the step 362. However, if the time has expired, the program proceeds to a step 368 where the spring release solenoid is deenergized to reapply the spring brake 301. Thereafter at step 336, the program proceeds directly to the step 362 from the step 364. Through the foregoing series of steps, when a shutdown is initiated, the spring 284 is wound to store the desired restart assist energy and the valves 314 and 328 are both deenergized so as to store the fluid under pressure in the chamber of the accumulator 318 against the return force of the spring 326.

Assuming that the engine has been shut down and the vehicle operator now opens the throttle to initiate an automatic restart of the vehicle engine, the start flag is set at step 274 of FIG. 7 to command an automatic restart. This restart command is sensed at step 348 of the program which then proceeds to step 370 where the wind flag that was set at step 340 is reset in preparation for the winding of the spring 284 during the next automatic shutdown. Thereafter at step 372, the spring release solenoid is energized to release the spring 284 to assist in engine starting.

At step 374, the winding 315 of the slow fill accumulator valve 314 is energized via the output discrete section of the input/output section 110 of FIG. 1 to couple the pressurized fluid in the accumulator 318 to the fluid chamber in the forward drive clutch of the transmission 136 through the restriction 332 to slowly begin to fill the forward drive clutch of the automatic transmission to provide for a slowly increasing engagement force. Thereafter at step 376, the release timer flag referred to at step 356 is set. As indicated, this flag and the timing function associated with it insures that the spring is released for a predetermined time period so that it is fully unwound with each restart of the engine. From step 376, the program proceeds to step 378 where the start time flag referred to in step 350 is sampled. This flag is utilized in limiting the maximum amount of time that the starter motor can be energized to prevent overheating and to prevent excessive drain on the vehicle battery. If the start time flag is reset, the program proceeds to step 380 to set the start time flag and thereafter to step 382 to energize the starter motor to initiate restart of the vehicle engine. At the next step 384, a start timer register is reset.

During subsequent interrupt periods, the program proceeds from the step 378 to a decision point 386 where the start timer register is incremented and compared with a start time calibration value $T_S$. If the time has expired, the program proceeds to step 388 where the starter motor solenoid 142 is deenergized to terminate cranking of the engine 118. After step 388 or if the start time has not expired as sensed at step 386, or after step 384, the program proceeds to a decision point 390 where the angle of the throttles 119 is compared with a predetermined throttle angle value $T_k$ to differentiate between an operator commanded standing start or an operator commanded driveaway start. A throttle angle less than $T_k$ represents a standing start command while a throttle angle greater than $T_k$ represents a driveaway start command. Assuming the operator desires to initiate a standing start such as during a prolonged period of stopping to enable the vehicle air conditioner, he may open the throttles 119 to an angle less than $T_k$ or open the throttles 119 to any angle which is sensed at step 190 and indicated by setting the throttle open flag at step 198 and then allowing the throttles to close. The low throttle angle is sensed at step 390 after which the program proceeds to step 362 where the control winding 330 of the fast fill valve 328 is maintained deenergized so that fluid from the accumulator 318 is supplied to the fluid chamber of the forward drive clutch only through the restriction 332 so that the engagement force of the forward drive clutch slowly increases to provide a smooth start and prevent undesirable vehicle motion for the standing start. However, if the throttle position is greater than the predetermined value $T_k$ representing an operator commanded driveaway start, the program proceeds from the step 390 to a step 392 where the winding 330 of the fast fill valve 328 is energized to couple the fluid in the chamber 316 in the accumulator 318 directly to the fluid chamber of the forward drive clutch without restriction. The fluid under pressure in the accumulator 318 quickly fills the forward drive clutch so as to provide for a rapid increase in its engagement force to provide for a driveaway start. From steps 362 and 392, the program exits the restart control routine.

As can be seen from the foregoing, the restart control routine of FIG. 8 controls the rate of force buildup in the forward drive clutch between either a slowly increasing engagement force for a standing start or a rapidly increasing engagement force for a driveaway start.

Figure 9:
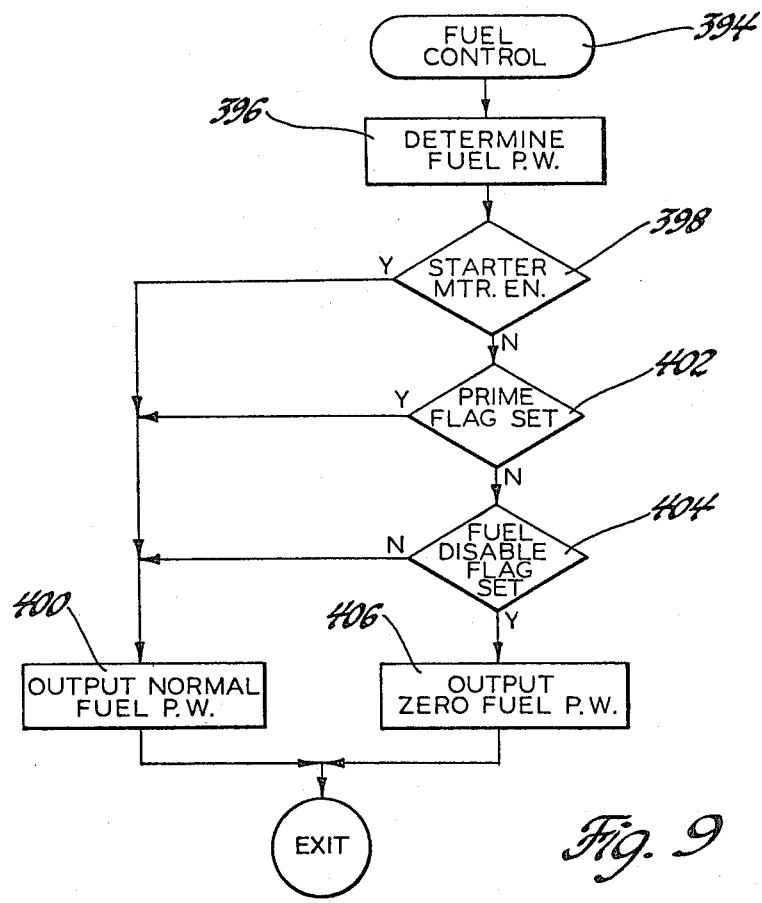

The fuel control routine 160 of FIG. 3 is illustrated in greater detail in FIG. 9. The fuel control routine is entered at point 394 and proceeds to step 396 where the desired fuel injection duration at the frequency of the reference pulses provided by the distributor 132 is determined. This step may include addressing a lookup table in the ROM 102 as a function of engine speed and manifold absolute pressure stored at step 158 to retrieve a pulse width producing a desired air/fuel ratio. The step 168 may also include other routines such as an acceleration enrichment routine, etc. as illustrated in U.S. patent application Ser. No. 052,571 filed June 27, 1979, now U.S. Pat. No. 4,245,605 and assigned to the assignee of this invention.

Following the determination of the fuel injection duration, the program proceeds to a decision point 398 where the energized state of the starter solenoid 142 is determined. If the starter motor is energized, the program proceeds to a step 400 where the fuel injection duration determined at step 396 is placed in a fuel control register in the output counter section of the input/output circuit 108. If the starter motor is not energized, the program proceeds from step 398 to step 402 to sample the state of the prime flag. If the prime flag is set indicating a command to supply fuel to the engine to prime the manifold during engine shutdown, the program proceeds to step 400 where the pulse width determined at step 396 is set into the fuel control register in the output counter section of the input/output circuit 108. If the prime flag is not set, the program proceeds to a decision point 404 where the status of the fuel disable flag is sampled. If the fuel disable flag is reset indicating normal fuel operation, the program again proceeds to the step 400. However, if the fuel disable flag is set indicating a command to shut down the engine, the program proceeds to the step 406 where the value of zero is placed into the fuel control register in the output counter section of the input/output circuit 108 so that no fuel will be supplied to the engine 118. From the steps 400 and 406, the program exits the fuel control routine.

Figure 10:
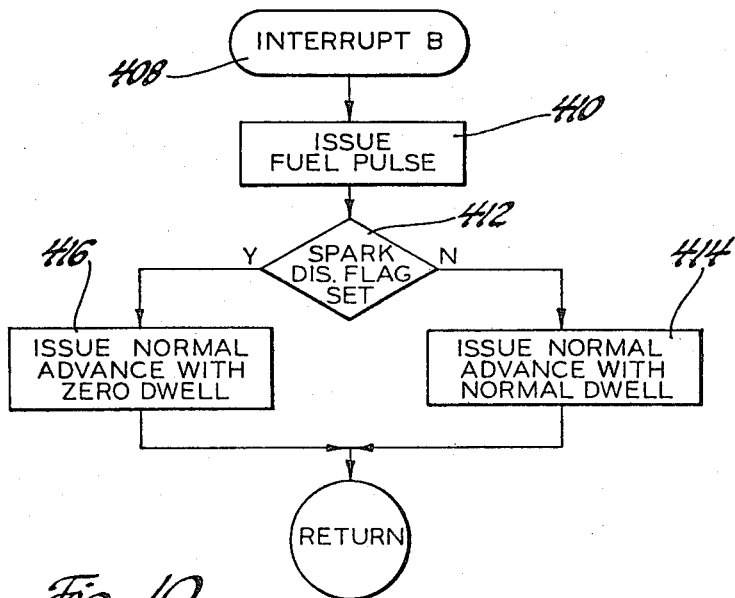

Referring to FIG. 10, the interrupt B routine initiated by the reference pulses supplied by the distributor 132 of FIG. 1 is illustrated. This routine is entered at point 408 and proceeds to a step 410 where the fuel pulse width set into the fuel control register in the output counter section of the counter input/output circuit 108 at step 400 or 406 in FIG. 9 is transferred to a fuel control down counter to initiate the fuel injection pulse to the injectors 120 via the driver circuit 122. The resulting fuel pulse width is the time required for the fuel control down counter to be clocked down to zero. If the fuel pulse width is initially zero as set at step 406, the fuel pulse width is zero so that fuel flow to the engine 118 is terminated.

The program next proceeds to a decision point 412 where the status of the spark disable flag is sampled. If the spark disable flag is reset indicating desired normal spark, the program proceeds to the step 414 where the spark timing and dwell values determined during the spark control routine 162 of FIG. 3 are transferred from the respective registers in the input/output circuit 108 to a spark timing control down counter and a dwell control counter to provide spark control. In this respect, the spark timing control down counter may be clocked down to zero first after which the dwell control down counter is clocked down to zero with a pulse being provided to bias the transistor 124 conductive during the period the dwell control counter is being clocked. When this pulse terminates, the transistor 124 is turned off to provide spark ignition.

If at step 412 it is determined that the spark disable flag is set, the program proceeds to step 416 where the spark timing value previously set into the spark timing control register is transferred to the spark timing down counter. However, to disable spark ignition, the dwell control down counter is cleared so that it represents zero dwell. With zero dwell, the primary winding control transistor 124 is maintained continuously off to inhibit the generation of any spark for ignition. Spark ignition may be inhibited by other means than setting the dwell value to zero. For example, an output discrete signal from the circuit 110 of FIG. 1 may be generated to control a switch to open the primary winding circuit of the ignition system during the period the ignition circuit is to be disabled.

From the steps 414 and 416, the program exits the interrupt B routine.

The foregoing description of a preferred embodiment for the purposes of illustrating the invention is not to be considered as limiting or restricting the invention since many modifications may be made by the exercise of skill in the art without departing from the scope of the invention. For example, various timers may be included to filter selected signals or to delay certain events. For example, a timer may be employed when the starter motor is deenergized as sensed at step 208 before the emergency restart flag is set at step 204 to allow the battery voltage to stabilize after the starter motor is deenergized. A further timer may be employed after step 212 to delay setting of the shutdown flag at step 220 when the throttle is first closed and the speed enable flag is set so as to allow the torque converter clutch in the transmission to release (if one is utilized) before the engine is allowed to shut down.

The embodiments of the invention in which an exclusive property or privilege is claimed are defined as follows:

1. An automatic shutdown and restart system for a vehicle internal combustion engine having an intake space from which fuel and air are drawn into a combustion space to undergo combustion, a manually operable engine control member for providing operator control of engine speed, and a starter motor, the system comprising:

means effective to supply fuel to the intake space;
   means effective to ignite the fuel and air mixture drawn into the combustion space;
   means effective to sense engine rotational speed;
   shutdown means responsive to one characteristic of the engine control member, the shutdown means being effective to (a) disable the fuel supply means from supplying fuel to the intake space to effect engine shutdown and to (b) re-enable the fuel supply means and disable the ignition means when the engine rotational speed decreases to a predetermined value to charge the intake space with a combustible mixture; and
   restart means responsive to a second characteristic of the engine control member effective to (a) energize the starter motor to effect restart of the internal combustion engine and (b) deenergize the starter motor when the engine rotational speed represents the engine has started, whereby the charging of the intake space with a combustible mixture during engine shutdown is effective to provide a combustible mixture that is drawn into the combustion space when restart is initiated to effect immediate restart of the internal combustion engine.

2. An automatic shutdown and restart system for a vehicle internal combustion engine having an intake space from which fuel and air are drawn into a combustion space to undergo combustion, a manually operable throttle valve for controlling air flow into the intake space and a starter motor, the system comprising:

means effective to supply fuel to the intake space;
   means effective to ignite the fuel and air mixture drawn into the combustion space;
   means effective to sense engine rotational speed;
   shutdown means responsive to the closure of the throttle valve effective to (a) disable the fuel supply means from supplying fuel to the intake space to effect engine shutdown and to (b) re-enable the fuel supply means and disable the ignition means when the engine rotational speed decreases to a predetermined value to charge the intake space with a combustible mixture; and
   restart means responsive to the opening of the throttle valve effective to (a) energize the starter motor to effect restart of the internal combustion engine and (b) deenergize the starter motor when the engine rotational speed represents the engine has started, whereby the charging of the intake space with a combustible mixture during engine shutdown is effective to provide a combustible mixture that is drawn into the combustion space when restart is initiated to effect immediate restart of the internal combustion engine.

3. The method of shutting down and restarting a vehicle internal combustion engine having an intake manifold, a fuel supply system for supplying fuel to the intake manifold, an ignition system, a manually operable throttle valve for controlling air flow into the intake manifold, and a starter motor, the method comprising the steps of:

sensing engine speed;
   disabling the fuel supply system when the throttle valve is closed so as to shut down the engine;
   re-enabling the fuel supply system and disabling the ignition system when the engine speed decreases to a predetermined value to charge the intake manifold with a combustible mixture;
   energizing the starter motor when the throttle valve is opened to restart the engine; and
   deenergizing the starter motor when the engine speed represents that the engine is running, whereby the charging of the intake manifold provides immediate engine restarting capability.

* * * * *